(12) United States Patent
Allison

(10) Patent No.: US 10,433,561 B2
(45) Date of Patent: Oct. 8, 2019

(54) TACO-FUNNEL APPARATUS AND METHOD OF USE

(71) Applicant: Todd N. Allison, Pittsburg, KS (US)

(72) Inventor: Todd N. Allison, Pittsburg, KS (US)

(*) Notice: Subject to any disclaimer, the term of this patent is extended or adjusted under 35 U.S.C. 154(b) by 552 days.

(21) Appl. No.: 15/226,392

(22) Filed: Aug. 2, 2016

(65) Prior Publication Data

US 2017/0035063 A1 Feb. 9, 2017

Related U.S. Application Data

(60) Provisional application No. 62/201,357, filed on Aug. 5, 2015.

(51) Int. Cl.
| | | |
|---|---|---|
| *A21C 15/00* | (2006.01) | |
| *A23P 20/25* | (2016.01) | |
| *B67C 11/00* | (2006.01) | |

(52) U.S. Cl.
CPC .......... *A21C 15/007* (2013.01); *A21C 15/002* (2013.01); *A23P 20/25* (2016.08); *B67C 11/00* (2013.01)

(58) Field of Classification Search
CPC ........ A21D 13/40; A21D 13/32; A21D 13/33; A21D 13/36; A21C 15/007; A23P 20/25; B67C 11/00
USPC ..... 99/494, 450.6, 450.7; 141/340, 341, 342
See application file for complete search history.

(56) References Cited

U.S. PATENT DOCUMENTS

| | | | | | |
|---|---|---|---|---|---|
| 192,348 | A | * | 6/1877 | Preston | .......................... 141/340 |
| 2,502,298 | A | * | 3/1950 | White | ..................... B67C 11/00 |
| | | | | | 141/332 |
| 2,780,081 | A | * | 2/1957 | Alexander | .............. A47J 31/44 |
| | | | | | 141/341 |
| 5,678,476 | A | * | 10/1997 | Sanders | .................... A21C 9/04 |
| | | | | | 118/15 |
| 6,668,705 | B1 | * | 12/2003 | Dawn | ..................... A47J 36/20 |
| | | | | | 221/312 C |
| 8,337,918 | B1 | * | 12/2012 | Fair | ........................ A47G 19/16 |
| | | | | | 426/82 |
| 8,602,071 | B1 | * | 12/2013 | Eno | ....................... B65B 39/007 |
| | | | | | 141/114 |
| 8,826,949 | B2 | * | 9/2014 | Kent | ....................... B67C 11/02 |
| | | | | | 141/340 |
| 2017/0303547 | A1 | | 10/2017 | Girgenti | |

* cited by examiner

*Primary Examiner* — Reginald Alexander
(74) *Attorney, Agent, or Firm* — Law Office of Mark Brown, LLC; Christopher M. DeBacker

(57) ABSTRACT

A food wrapper filling system for use with edible or non-edible food wrappers. The system includes a funnel device portion and a stand portion. The stand portion is placed over the food wrapper item and the funnel device is inserted into a receiver within the stand. Food ingredients are placed into the funnel device through a throat and opening through the funnel device, and the ingredients are stacked neatly without spillage or mess within the food wrapper. Sizing plates or funnel inserts can be used to limit the amount of space within the funnel device that ingredients may be added into for use with smaller sized food wrappers.

7 Claims, 7 Drawing Sheets

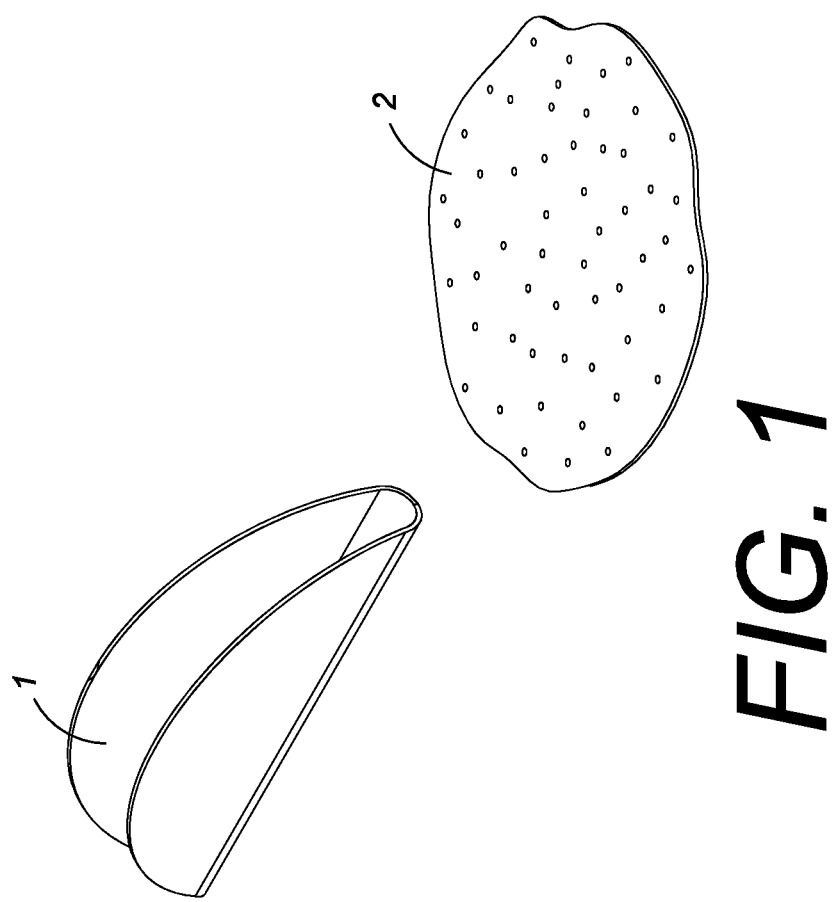

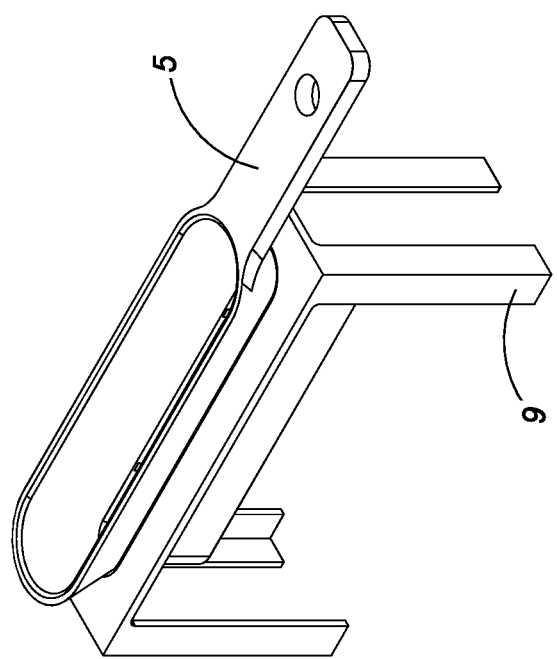

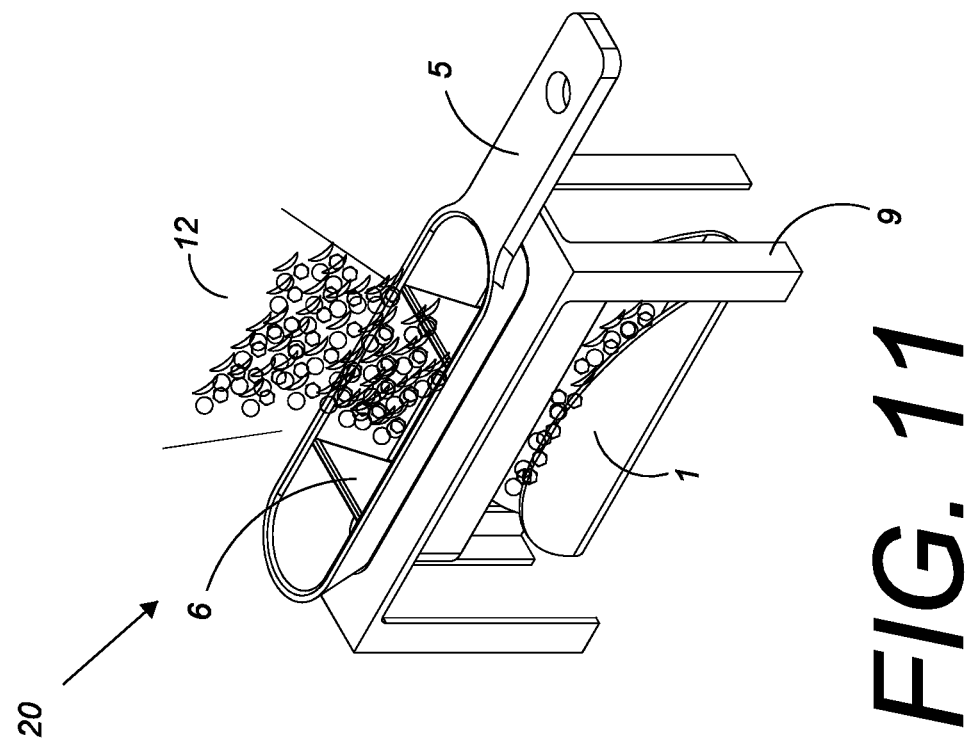
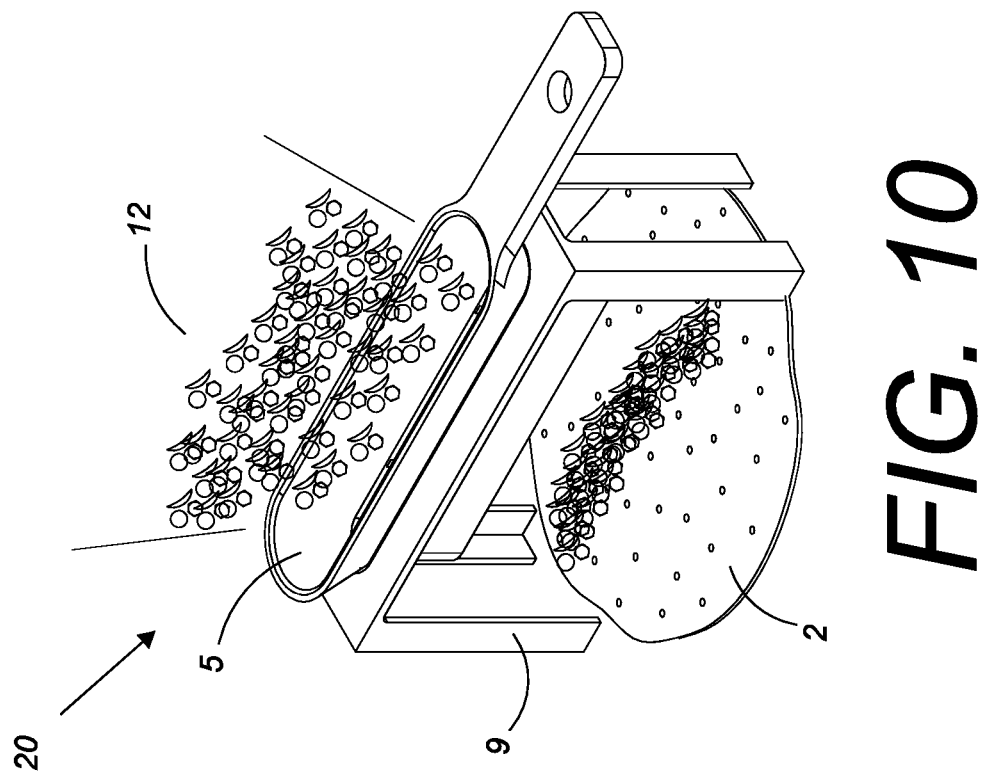

TACO-FUNNEL APPARATUS AND METHOD OF USE

CROSS-REFERENCE TO RELATED APPLICATION

This application claims priority in U.S. Provisional Patent Application No. 62/201,357 filed Aug. 5, 2015, which is incorporated herein by reference.

BACKGROUND OF THE INVENTION

1. Field of the Invention

The present invention relates generally to a food wrapper filling device and method for use thereof, and more specifically to a funnel device having a funnel for filling food wrappers, specifically tacos or taco-shaped foods.

2. Description of the Related Art

Taco shells and other taco-shaped foods are often difficult to fill because of their unusual shape, various filling types, and the tendency of shells in particular to bake closed. Other funnels have been invented to fill food containers, but none are adapted for use to fill tacos, folded foods or folded wrappers. Existing products and methods require more time and more mess than is ideal. What is needed is a device specifically designed to easily fill taco shells and other similarly shaped food containers with no mess and in a short amount of time.

Heretofore there has not been available a system or method for a taco funnel with the advantages and features of the present invention.

BRIEF SUMMARY OF THE INVENTION

The present invention provides a food wrapper filling system for use with edible or non-edible food wrappers. The system includes a funnel device portion and a stand portion. The stand portion is placed over the food wrapper item and the funnel device is inserted into a receiver within the stand. Food ingredients are placed into the funnel device through a throat and opening through the funnel device, and the ingredients are stacked neatly without spillage or mess within the food wrapper. Sizing plates or funnel inserts can be used to limit the amount of space within the funnel device that ingredients may be added into for use with smaller sized food wrappers.

BRIEF DESCRIPTION OF THE DRAWINGS

The drawings constitute a part of this specification and include exemplary embodiments of the present invention illustrating various objects and features thereof.

FIG. 1 is a three-dimensional representation of a pair of common food wrapper elements.

FIG. 9 is a three-dimensional isometric view of the funnel element contained within the stand element thereof.

FIG. 10 shows a first application of the present invention in a typical environment using one food wrapper element type.

FIG. 11 shows a second application of the present invention in a typical environment using another food wrapper element type.

DETAILED DESCRIPTION OF THE PREFERRED EMBODIMENTS

I. Introduction and Environment

Figure 3:
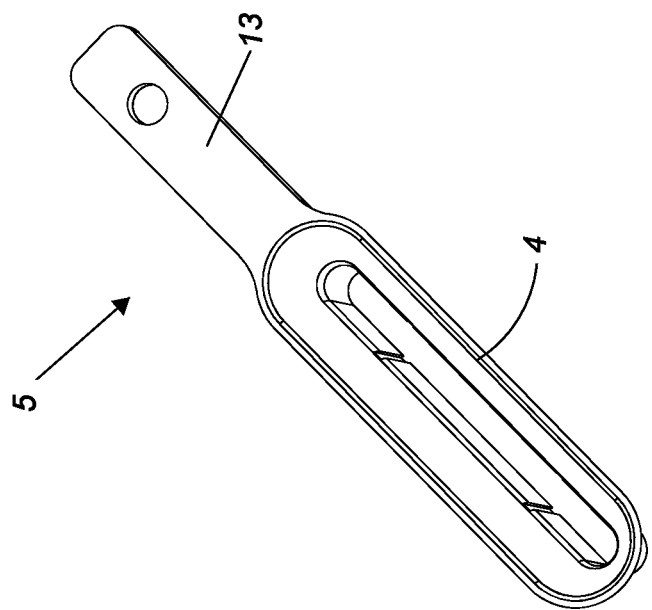
FIG. 3 is a top view thereof.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning. For the purposes of this application, a taco could be interpreted as any food having an edible outer container, although an inedible wrapper could also be used in its place.

II. Preferred Embodiment Taco Funnel System 20

FIGS. 10 and 11 show the complete taco funnel system 20 in action, wherein typical ingredients 12 are placed into the funnel device 5 placed within a stand 9 over a food wrapper device, such as a flat tortilla 2 or a hard taco-shaped wrapper 1 (e.g. taco shell).

Figure 2:
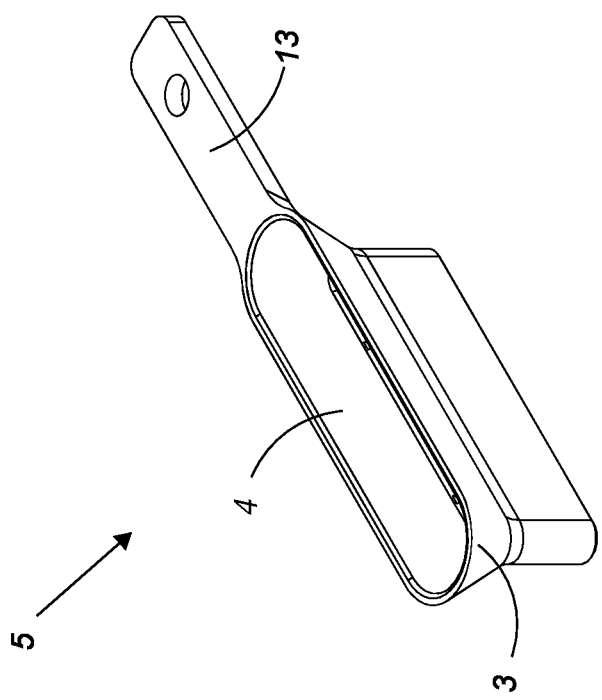
FIG. 2 is a three-dimensional isometric view of a funnel element of preferred embodiment of the present invention.

FIGS. 2-3 show the funnel device 5, which consists of a funnel-shaped end 3 connected to a handle 13, the funnel-shaped end having an internal throat 4 for receiving ingredients.

Figure 5:
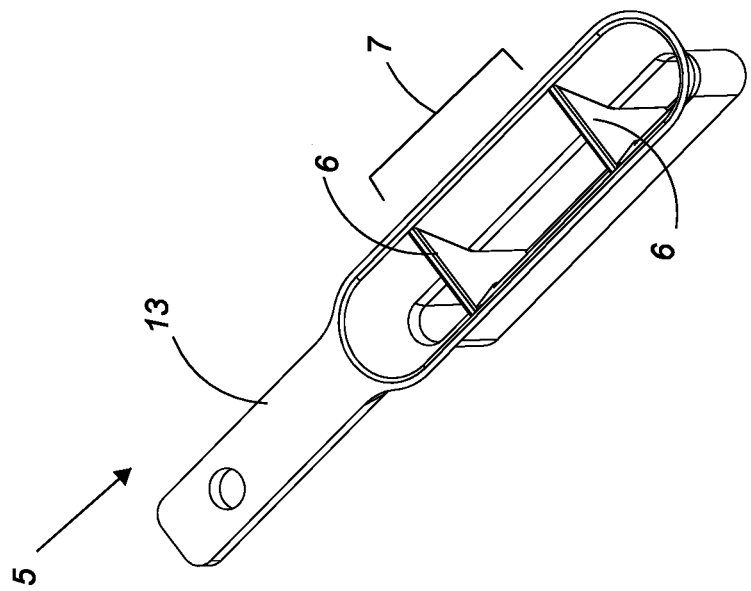
FIG. 5 is a continuation thereof, showing the sizing plates inserted.
Figure 4:
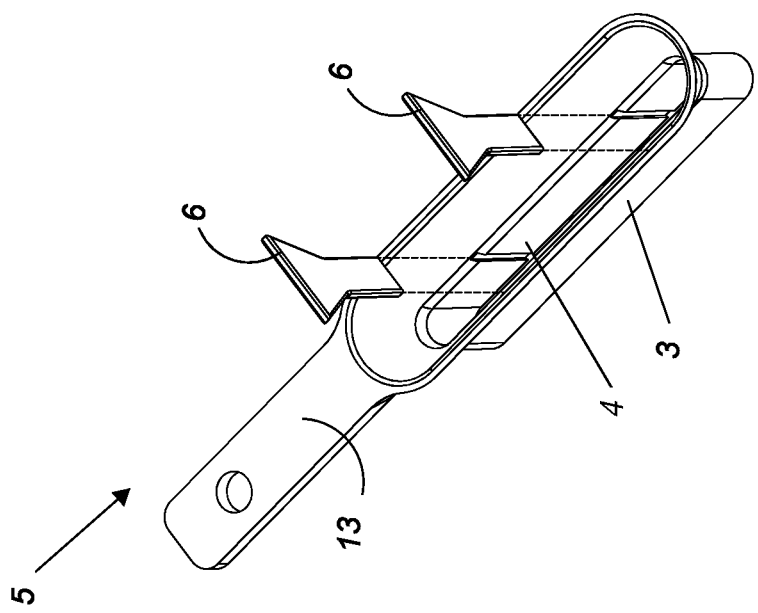
FIG. 4 is a partially exploded view of the present invention showing a pair of sizing plates being inserted therein.

FIGS. 4-5 show the funnel device 5 with a pair of sizing plates 6 being inserted into the throat 4 of the funnel end 3. The adjusted filling space 7 of FIG. 5 indicates that a more limited amount of ingredients can be funneled through the device, as shown in FIG. 11.

Figure 7:
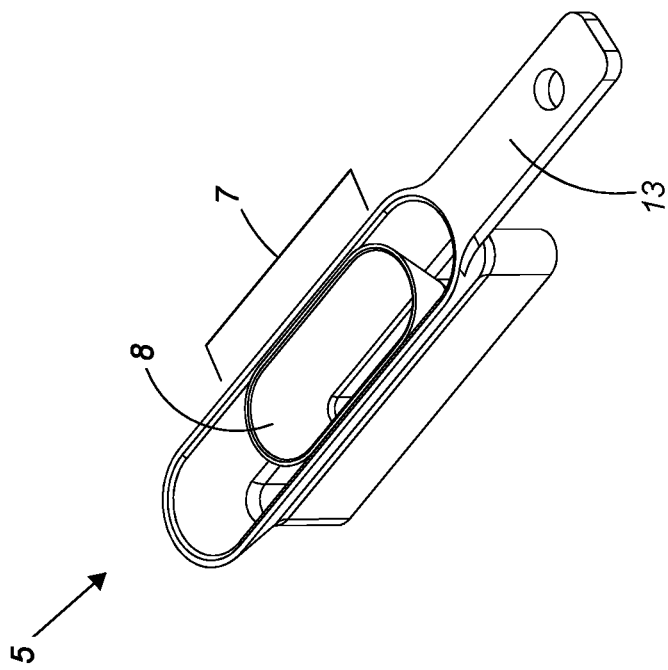
FIG. 7 is a continuation thereof, showing the funnel-shaped insert inserted.
Figure 6:
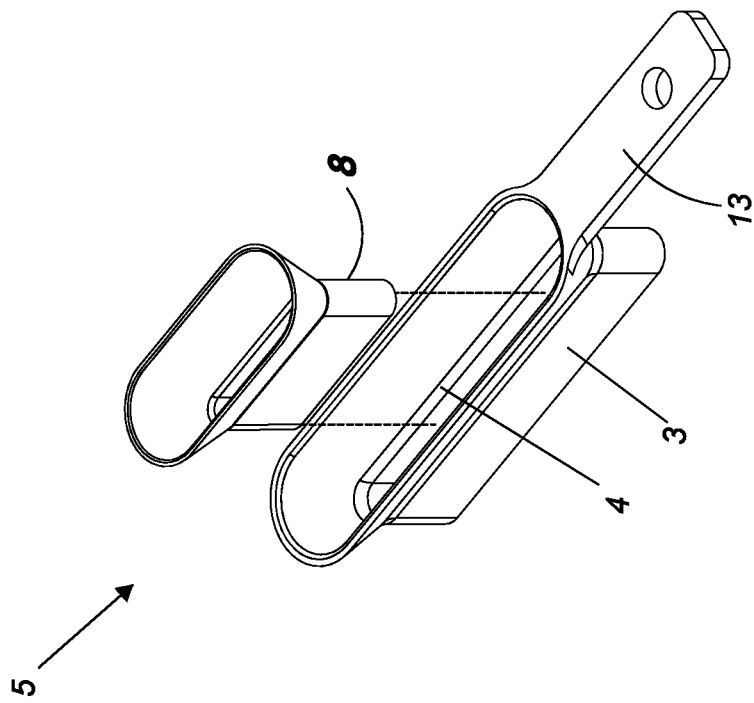
FIG. 6 is a partially exploded view of the present invention showing a funnel-shaped insert being inserted therein.

FIGS. 6-7 show an alternative arrangement with the funnel device 5 where a funnel-shaped insert 8 is inserted into the throat 4 of the funnel end 3, thereby creating an adjusted filling space 7 shown in FIG. 7. This design may be simpler to use than the sizing plates indicated above, but would require more material to manufacture.

Figure 8:
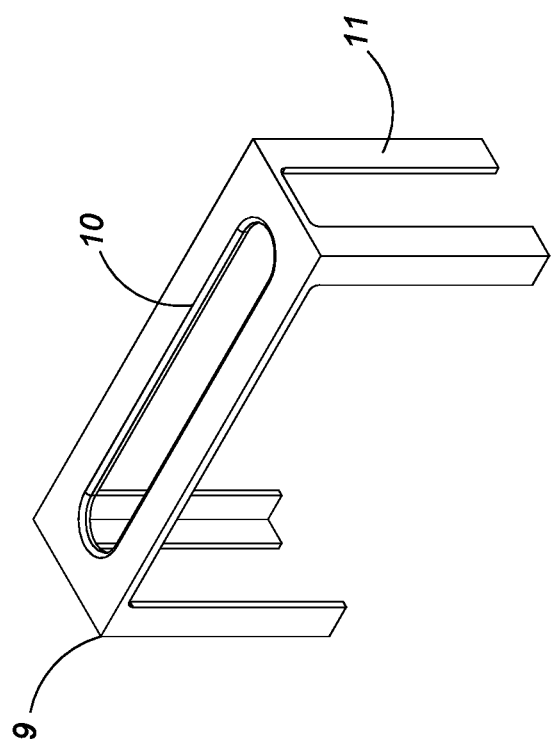
FIG. 8 is three-dimensional isometric view of a stand element of a preferred embodiment of the present invention.

FIG. 8 shows a stand 9 having legs 11 and a top opening 10 for receiving the funnel device 5. The stand 9 stands over the food wrapper 1, 2 as shown in FIGS. 10-11, with the legs placed about the wrapper. As shown in FIG. 9, the funnel device 5 is then placed within the stand 9 and as shown in FIGS. 10-11, the food ingredients 12 are placed into the funnel in the space available (e.g. space may be limited due to sizing plates 6 or a funnel-shaped insert 8), and into the food wrapper 1, 2, thereby creating a final product with little to no mess. Food ingredients could even be layered into the wrapper by placing them through the funnel device 5 in order.

The funnel device 5 could also be used individually without the stand 9 by sliding the funnel into a taco shell, where all of the ingredients are then layered into the funnel and then the funnel can be pulled away from the shell leaving all the layers in the shell. This can be repeated over and over for a line of shells.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A food wrapper filling system comprising:
    a funnel device having a funnel-shaped first end containing a throat and an opening passing vertically through said funnel-shaped first end, and a handle affixed to said first end;
    a stand having four spaced legs supporting a top platform, said stand configured to be placed over a food wrapper;
    an opening in said top platform configured to receive said funnel-shaped first end of said funnel device;
    a pair of sizing plates configured to be inserted within said throat of said funnel device;
    whereby said pair of sizing plates limits a filling space capable of receiving said ingredients within said funnel device throat; and
    said funnel device configured to receive food ingredients through said throat and opening, wherein said food ingredients pass through said funnel device and said stand into said food wrapper.

2. The system of claim 1, wherein said food wrapper is edible.

3. The system of claim 2, wherein said food wrapper is selected from the list comprising: a tortilla; a pancake; and a hard taco shell.

4. The system of claim 1, further comprising:
    a funnel-shaped insert configured to be inserted within said throat of said funnel device; and
    whereby said funnel-shaped insert limits a filling space capable of receiving said ingredients within said funnel device throat.

5. The system of claim 4, further comprising:
    wherein said funnel-shaped insert comprises a top portion and a bottom portion, wherein said top portion is wider than said bottom portion;
    wherein said top portion is configured to be received within said throat of said funnel device; and
    wherein said bottom portion is configured to be received within said opening of said funnel device.

6. A food wrapper filling system comprising:
    a funnel device having a funnel-shaped first end containing a throat and an opening passing vertically through said funnel-shaped first end, and a handle affixed to said first end;
    a stand having four spaced legs supporting a top platform, said stand configured to be placed over a food wrapper;
    an opening in said top platform configured to receive said funnel-shaped first end of said funnel device;
    a funnel-shaped insert configured to be inserted within said throat of said funnel device;
    whereby said funnel-shaped insert limits a filling space capable of receiving said ingredients within said funnel device throat; and
    said funnel device configured to receive food ingredients through said throat and opening, wherein said food ingredients pass through said funnel device and said stand into said food wrapper.

7. The system of claim 6, further comprising:
    wherein said funnel-shaped insert comprises a top portion and a bottom portion, wherein said top portion is wider than said bottom portion;
    wherein said top portion is configured to be received within said throat of said funnel device; and
    wherein said bottom portion is configured to be received within said opening of said funnel device.

* * * * *